(12) United States Patent
Stiesdal

(10) Patent No.: US 9,415,875 B2
(45) Date of Patent: Aug. 16, 2016

(54) HEATING MATS ARRANGED IN A LOOP ON A BLADE

(75) Inventor: Henrik Stiesdal, Odense C. (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 973 days.

(21) Appl. No.: 13/639,148

(22) PCT Filed: Sep. 16, 2010

(86) PCT No.: PCT/EP2010/063622
§ 371 (c)(1),
(2), (4) Date: Oct. 3, 2012

(87) PCT Pub. No.: WO2011/127997
PCT Pub. Date: Oct. 20, 2011

(65) Prior Publication Data
US 2013/0022465 A1 Jan. 24, 2013

(30) Foreign Application Priority Data

Apr. 12, 2010 (EP) ..................................... 10159632

(51) Int. Cl.
*F03D 11/00* (2006.01)
*B64D 15/12* (2006.01)

(52) U.S. Cl.
CPC ............ *B64D 15/12* (2013.01); *F03D 11/0025* (2013.01); *F05B 2230/31* (2013.01); *Y02E 10/722* (2013.01); *Y02P 70/523* (2015.11)

(58) Field of Classification Search
CPC ...... F03D 11/0025; F03D 1/003; B64D 15/12
See application file for complete search history.

(56) References Cited

U.S. PATENT DOCUMENTS

| | | | |
|---|---|---|---|
| 2,742,248 A | 4/1956 | Le Compte | |
| 6,338,455 B1* | 1/2002 | Rauch | B64D 15/12 244/134 D |
| 7,078,658 B2* | 7/2006 | Brunner | B64D 15/12 219/201 |
| 2011/0290784 A1* | 12/2011 | Orawetz | B64D 15/12 219/486 |
| 2013/0022466 A1* | 1/2013 | Laurberg | F03D 11/0025 416/95 |
| 2013/0195661 A1* | 8/2013 | Lind | F03D 11/0025 416/95 |

FOREIGN PATENT DOCUMENTS

| | | |
|---|---|---|
| EP | 1564142 A1 | 8/2005 |
| GB | 724745 A | 2/1955 |
| GB | 2319942 A | 6/1998 |
| GB | 2450503 A | 12/2008 |
| WO | WO 9853200 A1 | 11/1998 |
| WO | WO 2006107741 A2 | 10/2006 |

* cited by examiner

*Primary Examiner* — Dwayne J White
*Assistant Examiner* — Danielle M Christensen

(57) ABSTRACT

A wind turbine blade is disclosed. The blade includes a heating mat for generating heat. The heating mat is mounted at an outer surface of the blade. The heating mat includes a first section with a first end section and a second section with a second end section. The first end section and the second end section are electrically connectable to a respective power terminal for supplying power to the heating mat. The second end section defines an opposite end section of the heating mat in a longitudinal direction of the heating mat with respect to the first end section. The first section and the second section run along the surface of the blade in one or more loops from the first end section to the second end section.

13 Claims, 2 Drawing Sheets

HEATING MATS ARRANGED IN A LOOP ON A BLADE

CROSS REFERENCE TO RELATED APPLICATIONS

This application is the US National Stage of International Application No. PCT/EP2010/063622, filed Sep. 16, 2010 and claims the benefit thereof. The International Application claims the benefits of European application No. 10159632.8 EP filed Apr. 12, 2010. All of the applications are incorporated by reference herein in their entirety.

FIELD OF INVENTION

The present invention relates to a blade for a wind turbine, to a method for controlling the heating of the heating mat of the blade and to a method of manufacturing a blade with a heating system for a wind turbine.

ART BACKGROUND

Icing on any exposed part of a wind turbine can occur and cause decreased performance of the wind turbine. Furthermore e.g. when ice is accumulated on one or more of the rotor blades of a wind turbine, excess vibration problems from uneven blade icing may occur. This in turn may generate excessive mechanical loads on the wind turbine components leading eventually to wind turbine shut-down or to wind turbine faults.

Hence, it is necessary to avoid ice or to remove ice located on wind turbine blades by a deicing system or by a heating system. In particular, it is known to use an electrical heating that is attached to an outer surfaces of the blade.

The heating is connected by electrical wiring to a power supply and to a control unit. The wiring is easy to be damaged by lightning strikes, because the conductors run along the outer surface of the blade to the location of the heating.

In particular, there is also a need to heat the tip ends of the blades, so that in conventional heating systems a conductor has to run from the tip end to the root end of the blade. In particular, in the region of the tip end of the blade, the risk is severe that the conductor running to the heating being hit by a lightning strike.

SUMMARY OF THE INVENTION

The object of the present invention is to provide a robust blade for a wind turbine comprising a heating system.

This object is solved by a blade for a wind turbine, by a method for controlling the heating of a heating mat of the blade and by a method of manufacturing a blade with a heating system for a wind turbine according to the independent claims.

According to a first aspect of the present invention, a blade for a wind turbine is presented. The blade comprises a heating mat. The heating mat generates heat, wherein the heating mat is mounted to the blade, e.g. to an outer surface of the blade, inside a laminate of the blade or to an inner space of the blade. The heating mat comprises a first section with a first end section and a second section with a second end section. The first end section and the second end section are electrically connectable (e.g. by a cable) to a respective power terminal for supplying power to the heating mat. The second end section defines an opposite end section of the heating mat in the longitudinal direction of the heating mat with respect to a first end section. The first section and the second section run along the surface of the blade in one or more loops from the first end section to the second end section.

According to a further aspect of the present invention, a method of manufacturing a blade with a heating system for a wind turbine is presented. According to the method, a heating mat for generating heat is mounted at an outer surface of the blade, wherein the heating mat comprises a first section with a first end section and a second section with a second end section. The second end section defines an opposite end section of the heating mat in a longitudinal direction of the heating mat with respect to the first end section. The first end section and the second end section are electrically connected, e.g. by a cable, to a respective power terminal. The first section and the second section run along the surface of the blade in one or more loops from the first end section to the second end section.

The heating mat is generally formed as a flat stripe-shaped mat extending in a longitudinal direction. The longitudinal direction defines the direction between two end points of the heating mat (in particular the direction or distance between two end points parallel to a plane that is parallel to the blade surface) between which the length of the heating mat is defined. The height extends vertically (in particular parallel to a normal of the (plane of the) outer blade surface) form the outer surface of the heating mat, and the width of the heating mat is the distance from side to side, measuring across the heating mat at right angles to the length. The width is shorter than the length of the heating mat. The width may be approximately 25 cm (centimeter) to 1.50 m (meter), preferably approximately 55 cm. The length of the heating mat may be generally twice as much as the length of the blade. The heating mat may comprise a length of approximately 60 m to 200 m (meter), preferably 90 m. Accordingly, the blade may have a length of approximately 30 m to 100 m (meter). The height of the heating mat may be approximately 0.5 mm (Millimeter) cm to 1 cm (centimeter). Preferably, the heating mat comprises an area density of the fibers of approximately 400 g/m$^2$ to 800 g/m$^2$, in particular approximately 600 g/m$^2$ (grams per square meter). On opposed ends along the longitudinal (extending) direction, the first end section and the second end section are formed. To the first end section and the second end section a power input and/or a power output connection may be attached.

By the power terminals, a voltage of 100 V AC to 1000 V (Volt) AC is applicable. In a static condition of the blades or the wind turbine, a voltage of 400 V AC the heating mat may generate a temperature of approximately 10° C. (Celsius) and a voltage of 650 V AC to 750 V AC may generate a temperature of approximately 20° C. to 30° C. This may though vary in dependency of the chosen heating mat area density and heating mat area. In a working condition of the blades, it is desired to apply a voltage for generating a heat by the heating mat along the surface of the blade of approximately a temperature of 2° C. to 4° C. in order to have a proper de-icing effect.

The heating mat comprises a run parallel to the plane of the blade surface with e.g. a half-loop shape within a plane that is in general parallel to the plane of the blade surface. The heating mat runs from one power terminal (e.g. located on the blade, in the hub or in the wind turbine housing,) with an open loop (e.g. with a curve with approximately 180 degrees) or with more loops back to a further power terminal. The section of the heating mat that connects the first section and the second section is the transition section.

This has the technical effect, that no electrical connections, such as electrical wires, are needed to be mounted and connected along the blade surface except in a common section, where the first and second end section are located. Thus, less risk of damages to the heating mat due to lightning strikes or other physical impacts are reduced.

According to a further exemplary embodiment, the blade further comprises a power transmitting section located on the outer surface. The power transmitting section comprises the power terminals for supplying power to the heating mat, wherein the first end section and the second end section are located inside the power transmitting section and are electrically connected to the power terminals. The heating mat runs with the first section from the first end section to a region being located outside of the power transmitting section and runs with the second section from the region being located outside of the power transmitting section to the second end section inside the power transmitting section.

By the present exemplary embodiment, the heating mat forms an open loop and/or a plurality of loops, wherein in one common power transmitting section the first end section and the second end section are connected to a power supply via the power terminals. Thus, the electrical connection and thus the sole necessary electrical wiring have to be applied at the power transmitting section and not in another section of the blade, such as the tip end section.

According to a further exemplary embodiment, the heating mat comprises (electrical conducting) carbon fibres for generating heat. Carbon fibres are very robust, so that the risk of damage caused by a lightning strike may be reduced. Moreover, the carbon fibres of the heating mat may be flexibly woven and thus adapted to the requirements of the blade to be heated. For instance, it may be beneficial to provide a higher density of the woven carbon fibres along the leading edge of the blade, so that more heat is produced in this leading edge area. Alternatively or additionally, the heating mat may also be made of conductive material, such as metal, e.g. copper fibres, or conductive synthetic material.

According to a further exemplary embodiment, the blade comprises a root end section with a fixing element for fixing the blade to a hub of the wind turbine. The power transmitting section is formed within the root end section. Furthermore, the blade comprises a tip end section, wherein the first section and the second section run together in the tip end section.

The fixing elements in the root end section are for instance fixing bolts for fixing a blade to a holder (hub) of the blades of the wind turbine. The root end section is located on the opposite side of the tip end of the blade with respect to a longitudinal direction of the blade. In particular, the root end section may describe the first half of the blade starting from the root end running along the longitudinal direction of the blade. In particular, the root end section may define one third, one fourth, one fifth of the blade section starting from the root end of the blade in longitudinal direction to the tip end. In particular, the root end section may define the section on the blade that extends from the root end approximately 1 m, 2 m, 5 m, 10 m or 20 m in the longitudinal direction to the tip end of the blade, for instance.

Thus, by locating the root end section close to the root end of the blade and by locating the power transmitting section in the root end section, the risk of damages by a lightning strike is reduced. In general, the likelihood that the blades getting hit by a lightning strike is higher in the area of the tip end section of the blade. Thus, the power connections of the heating mat at the first end section and the second end sections are located in the power transmitting section and thus in the root end section, so that a direct hit by a lightning strike at the tip end section does only hardly affect the connection of the end sections of the heating mat with the power terminals. Thus, the exemplary embodiment of the blade as described above is more robust, in particular in comparison to power connections or power connecting cables running along a blade for connecting a conventional heating mat at the section of the tip end of the blade.

The above-described transition section, which connects the first section and the second section (e.g. in the region outside of the power transmitting section) may be formed in the tip end section of the blade. Thus, according to this exemplary embodiment, the first section runs from the e.g. root end section of the blade, where the power transmitting section may be located, in longitudinal direction of the blade to the area of the tip end section, performs in the transition section e.g. a half loop or 1½ loops and runs with its second section back to the power transmitting section, wherein the second end section is connected to the power terminal.

Thus, there is no electrical connection between the root end and the tip end, so that lightning strikes that impact in the region of the tip end do not destroy the power connection to the heating mat, so that the general function of the heating mat is kept unaffected. In the transition section the heating mat may comprise a run that forms beside a half loop as well one or more full loops, so that a preferred pattern of the heating mat may be formed on the surface of the blade. Thus, an individually adjustable heating characteristic of the heating mat along the blade may be achieved.

According to a further exemplary embodiment, the heating mat is foldable for forming the loop. For example, the heating mat may be folded within the transition section for forming e.g. the half loop, the loop or more than one loop. In the further exemplary embodiment, the heating mat comprises a curved shape for forming a half-loop in the transition section. In the folded section, an insulation element may be interposed between the folded heating mat sections, so that a direct contact of heating mat layers of the first and second sections is prevented.

According to a further exemplary embodiment of the blade, the first section and the second section are mounted to the outer surface in such a way that between the first section and the second section a distance between each other is kept. Thus, an insulation between the first section and the second section is established simply by providing the distance. Thus, no undesired short circuit is generated, in particular outside of the transition section.

According to a further exemplary embodiment, the first section and the second section run in such a way that the first section and the second section at least partially overlap with each other. If the first section and the second section overlap each other, more heat is generated in particular in the overlapping region of the first section and the second section. The first section and the second section may cross each other. Additionally or alternatively, the first section and the second section may run parallel with respect to each other and overlap each other partially or completely. Thus, the generated heat may be concentrated to a predetermined location on the outer surface of the blade.

According to a further exemplary embodiment, the blade comprises an insulation layer, wherein the insulation layer is interposed between the first section and the second section. In order to prevent short circuits between the first section and the second section of the heating mat, an insulation layer may be interposed inside the distance and the first section and the second section, respectively. With other words, the insulation layer is filled in the distance between the first section and the second section of the heating mat.

According to a further exemplary embodiment, the power terminals comprise an input power terminal and an output power terminal. The first end section is connected to the input power terminal and the second end section is connected to the output power terminal.

According to a further exemplary embodiment, the heating mat further comprises a third section running from a third end of the heating mat along the blade surface to the first section and/or to the second section. The third section is coupled to the first section or to the second section in particular outside of the power transmitting section. By providing a further run of a further third section (for instance comprising with a run in longitudinal direction of the blade), a more complex and efficient heating pattern along the surface of the blade may be achieved. For instance, by providing a third section running from the power transmitting section along the (longitudinal direction) of the blade, the heating mat may form a kind of trident shape, for example.

According to a further exemplary embodiment, the third end section is electrically connected to a respective power terminal for power input or power output. If the third end section is electrically coupled (e.g. in the power transmitting section) to the power terminals as well, a more individual power supply to the individual end sections of the heating mat is applicable, so that the heating characteristics and the heating location along the heating mat may be adjusted individually with respect to several locations along the blade.

According to a further exemplary embodiment, the blade further comprises a further heating mat for generating heat. The further heating mat is mounted at the outer surface of the blade, wherein the further heating mat comprises a further first section with a further first end section and a further second section with a further second end section. The further first end section and the further second end section are electrically connectable to a respective power terminal for supplying power to the further heating mat. The further first section and the further second section run along the surface of the blade in one or more loops from the further first end section to the further second end section. For example, the further second end section defines an opposite end section of the further heating mat in a further longitudinal direction of the further heating mat with respect to the further first end section.

In a further exemplary embodiment, the power transmitting section comprises further power terminals for supplying power to the further heating mat. The further first end section and the further second end section are located inside the power transmitting section and are electrically connected to the further power supply terminals.

By the above-described exemplary embodiment, a separate further heating mat may be attached to the blade that may be controlled by an isolated and individual electrical circuit with respect to the heating mat. Thus, an individual heating pattern along the surface of the blade may be achieved by adding a plurality of individually controllable heating mats. All heating mats are connected to respective power terminals in a common power transmitting section.

According to a further aspect of the invention, a method for controlling the heating of the heating mat of the blade as described above is presented. The method comprises the measuring and controlling of the electrical power input to the heating mat by a control unit. The control unit (located e.g. in the blade, in the hub or in the housing of the wind turbine) controls the power being supplied to the heating mat via the power terminals.

According to an exemplary embodiment of the control method, the heating of the heating mat is controlled in dependency of a measured electrical conductivity of the heating mat. By measuring the electrical conductivity of the heating mat the control unit controls the positive or negative power input, so that the heat may be adjusted along the first and second section of the heating mat individually. The electrical conductivity may be measured by measuring the voltage difference of the heating mat between the power input and the power output and the current input.

The heating mat may comprise in an exemplary embodiment the first end section, the second end section, the third end section and/or more end sections that are electrically connected to respective power terminals. To each power terminal a positive voltage, a negative voltage or a zero potential is applicable. Thus, by controlling the kind of power input (positive voltage, negative voltage, zero potential) at the power terminals, the run or distribution of electrical conductivity inside the heating mat is controllable, so that desired locations or sections of the heating mat may be heated with a desired temperature. Thus, if icing in a certain section of the blade surface occurs, this section may be heated individually by the heating mat. Other sections of the blade surface, where no icing occurs, are not or lesser heated by the heating mat. Thus, by the control of the heating sections of the heating mat by controlling the kind of power input (negative or positive voltage input) at the end section of the heating mat, a more detailed heating control is achieved. In particular, the applied heating energy may be concentrated at the required blade sections to be deiced.

According to a further exemplary embodiment of the method for producing the blade, the mounting of the heating mat further comprises adding an adhesive to the outer surface of the blade, pressing the heating mat and the blade together for forming a laminate, and curing the adhesive. The laminate may be formed by resin transfer molding and/or vacuum infusion, for example. Moreover, a cover layer, for instance made of glass fibre may be added as an outer finishing layer for forming a homogeneous and even surface of the blade.

By the above-described blade, the heating mats may be electrically connected in one common power transmitting section, in particular located at the root end section, wherein each mat is connected to the power transmitting section by only two connection points in order to avoid wires running along the outer surface in the direction to the tip end of the blade.

The heating mats may be formed of electrical conducting carbon fibre material, like e.g. a flexible woven carbon fibre mat. Additionally, the flexible woven carbon fibres may be mixed together with or partially replaced by glass fibre mats that are used e.g. as material for the blades and in the manufacturing of the blades. Carbon fibre material is very persistent to heat and only a minor area with respect to copper heating mats may be damaged if a lightning strike hits the blade. Beside the carbon fibre mats copper heating mats may be used as well.

The above-described blades according to the present invention comprise heating mats that form a heating or deicing system. The one or more heating mats run along the longitudinal direction of the blade, wherein the run of the heating mats comprises at least one half, open loop in a plane parallel to the plane of the blade surface, so that the electrical connections at the first and second end sections of the blade are located at a desired location along the blade, e.g. in one common power transmitting section or in another desired section of the blade. A transition section may connect the first section and the second section of the heating mats, wherein in the transition section, the heating mats may form one or more loops.

The temperature of the heating mats may be controlled by the control unit, in particular by measuring the electrical conductivity of the heating mats. The electrical conductivity is per definition the inverse of the electrical resistance. The resistance increases or decreases in dependence of the temperature of the heating mats especially when the material of the heating mats comprises carbon fibre. The electrical conductivity of the heating mats may in this way be measured indirectly by measuring the resistance of the heating mats. By the control unit, the electrical voltage and the current input to the heating mats may be measured and controlled in dependency of a measured electrical conductivity of the heating mat.

The electrical conductivity of the heating mat may be measured by measuring a voltage difference of the first end section and the second end section of the heating mat and by measuring the electrical current input to the heating mat e.g. at the first end section of the heating mat. In this way the resistance and/or the electrical conductivity of the heating mat may be calculated.

The dimensions (height, length, width) and/or the thermal conductivity of the heating mat and of the insulation layers attached between the first section and the second section of the heating mat may be an input to an algorithm in the control unit. A measured wind speed measured by e.g. an anemometer may also be an input value to the control unit. In this way, the control unit may take into account as well the chill effect of the wind that is blown against the blade. The ambient temperature and/or the humidity may also be measured by sensors and may be input to the control unit to ensure that a suitable electrical voltage and current input to the heating mat, so that a proper deicing of the blade and/or avoiding icing of the blade is ensured.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
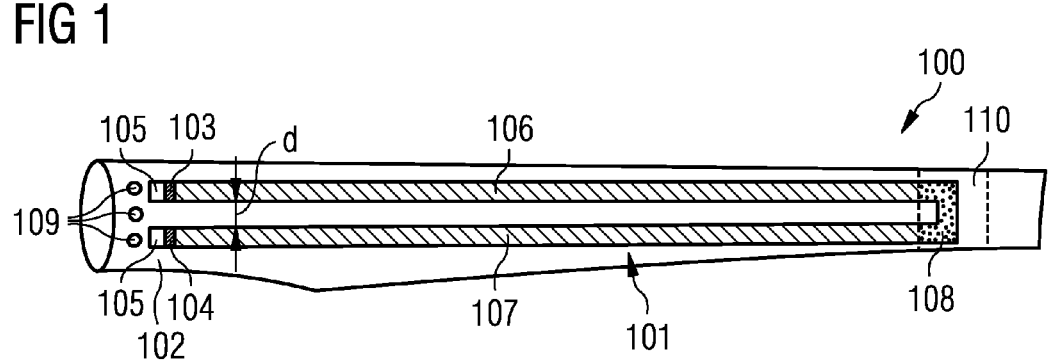
FIG. 1 illustrates a top view of a blade outer surface comprising a heating mat according to an exemplary embodiment of the present invention.

The illustrations in the drawings are schematical. It is noted that in different figures, similar or identical elements are provided with the same reference signs.

FIG. 1 shows a blade 100 for a wind turbine. The blade 100 comprises a heating mat 101 for generating heat and a power transmitting section 102 located on the outer surface of the blade 100. The heating mat 101 is mounted at the outer surface of the blade 100, wherein the heating mat 101 comprises a first section 106 with a first end section 103 and a second section 107 with a second end section 104. The first end section 103 and the second end section 104 are (each) electrically connected to on ore more respective power terminals 105. The second end section 104 defines an opposite end section of the heating mat 101 in a longitudinal direction of the heating mat 101 with respect to the first end section 103. The first section 106 and the second end section 107 run along the surface of the blade in one or more loops from the first end section 103 to the second end section 104.

The blade further comprises a power transmitting section 102 in which the power terminals 105 for supplying power to the heating mat 101 are located. The first end section 103 and the second end section 104 are located inside the power transmitting section 102 and are electrically connected to the power terminals 105. The heating mat 101 runs with the first section 106 to a region being located outside of the power transmitting section 102. The second section 107 runs from the region being located outside of the power transmitting section 102 to the second end section 104 inside the power transmitting section 102.

The blade 100 comprises a root end section in which fixing elements 109 are located for fixing the blade 100 to a hub of a wind turbine. The area around the fixing elements 109 may be described as root end section. In the root end section, the power transmitting section 102 is formed as shown in FIG. 1. From the root end section the blade 100 runs in longitudinal direction to its tip end. The section around the tip end is described as the tip end section 110. To the tip end section 110 most of the lightning strikes impact, so that there is a high risk of damage to the blade 100 and to electrical components, such as the heating mat 101 and in particular to electrical conductors running along the tip end section 110.

The heating mat 101 may be formed as a strap-like mat, that forms a half loop (e.g. a turn of approximately 180° degrees) when being attached to the outer surface of the blade 100. Each end of the heating mat 101 in longitudinal direction forms the first end section 103 and the second end section 104 of the heating mat 101. The first end section 103 and the second end section 104 are connected to the power terminals 105. The power terminals 105 supply power to the heating mat 101 for generating heat.

The heating mat 101 runs along the blade surface from the first end section 103 e.g. in longitudinal direction of the blade 100 until the tip end section 110 is reached. In the tip end section 110 the transition section 108 of the heating mat 101 is formed. In the transition section 108, the run of the heating mat 101 crosses over from the first section 106 to the second section 107. The run of the second section 107 starts from the transition section 108 and ends with its second end section 104 at the power transmitting section 102.

As can be taken from FIG. 1, the power connections that are necessary for the heating mat 101 are located in the same area, i.e. in the same the longitudinal section of the blade 100. As can be taken from FIG. 1, both electrical connections (power terminals 105) are located in the power transmitting section 102 at the root end of the blade 100. No electrical connections to a power supply and no electrical conductors that supply energy to the heating mat 100 are located outside of the power transmitting section 102. Thus, there is no need to provide power connections in the region of the tip end section 110 of the blade 100, so that the risk of damage caused by a lightning strike is reduced. In order to prevent a short circuitry, a distance d is provided between the first section 106 and the second section 107.

Figure 2:
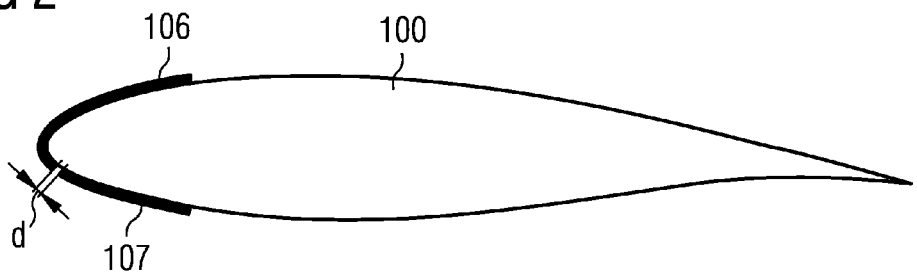
FIG. 2-FIG. 5 show exemplary layouts of the heating mat on the outer surface of the blade according to exemplary embodiments of the present invention.

FIG. 2 illustrates a cross-sectional view of the blade 100, wherein the heating mat 100 is attached to the outer surface of the blade 100 in the area of the leading edge of the blade 100. The run of the heating mat 101 corresponds to the run of the heating mat 101 as can be taken from FIG. 1. As can be seen in FIG. 2, the first section 106 and the second section 107 are spaced apart by a predefined distance d in order to prevent a short circuitry.

Figure 3:
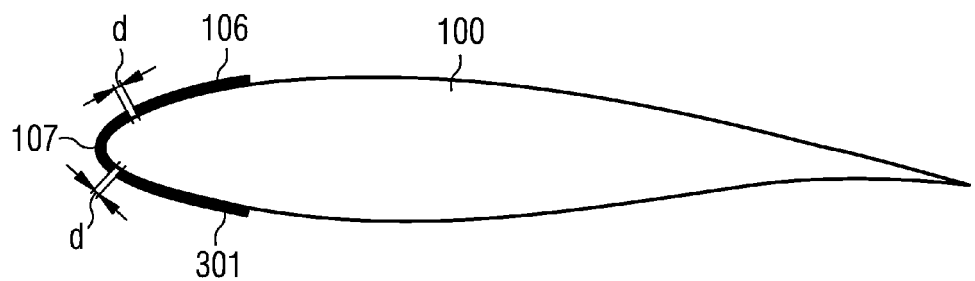

FIG. 3 illustrates a further exemplary embodiment of the present invention, in particular an exemplary embodiment comprising a heating mat 100 with a third section 301 of the heating mat 101. The third section 301 may run parallel to the first section 106 and the second section 107. Moreover, the third section 301 comprises an end section that is not connected to a power terminal 105. Additionally or alternatively, the third section 301 may comprise an end section that is attached to an electrical wire for power input or power output. In this case the first end section and the second end section may both be provided by either power input or power output.

As can be seen in FIG. 3, each section 106, 107, 301 of the heating mat 101 comprises a predefined distance d between each other.

Figure 4:
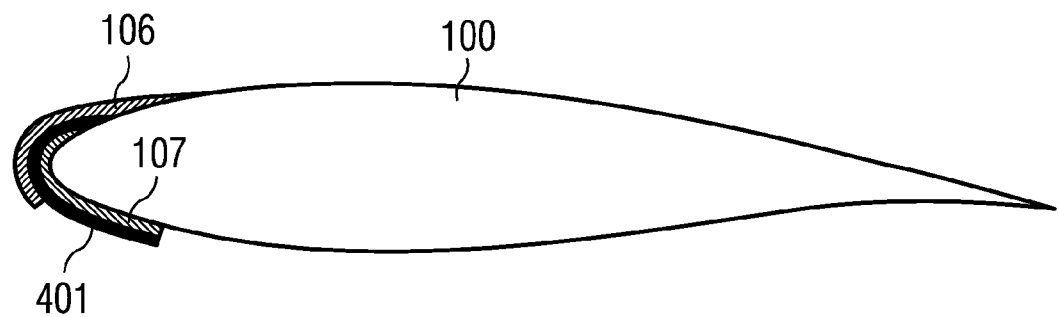

FIG. 4 shows an exemplary embodiment with a further exemplary run of the heating mat 100. In FIG. 4, the first section 106 and the second section 107 of the heating mat overlap with each other. Thus, for example in the area of the leading edge of the blade 100, more heat may be generated, if the first section 106 and the second section 107 overlap each other at the leading edge. In order to prevent a short circuitry, an insulation layer 401 is interposed between the first section 106 and the second section 107. In FIG. 4, the first section 106 and the second section 107 partially overlap.

Figure 5:
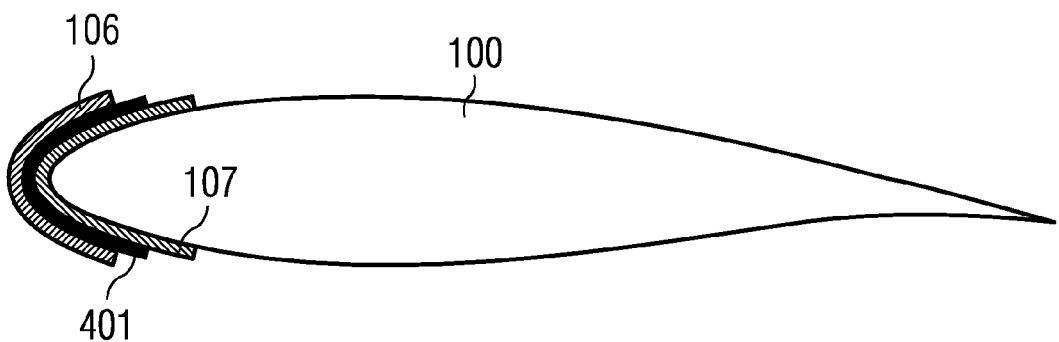

FIG. 5 shows an exemplary embodiment, wherein the first section 106 completely overlaps the second section 107. Between the first section 106 and the second section 107 the insulation layer 401 is interposed.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 blade
101 heating mat
102 power transmitting section
103 first end section
104 second end section
105 power terminal
106 first section
107 second section
108 transition section
109 fixing element
110 tip end section
301 third section
401 insulation layer
d distance between mat sections

The invention claimed is:

1. A blade for a wind turbine, the blade comprising:
a heating mat for generating heat is mounted at an outer surface of the blade, the heating mat comprising a first section with a first end section and a second section with a second end section, the first end section and the second end section are electrically connectable to a respective power terminal for supplying power to the heating mat, wherein the second end section defines an opposite end section of the heating mat in a longitudinal direction of the heating mat with respect to the first end section, and
wherein the first section and the second section run along the surface of the blade in at least one loop from the first end section to the second end section; wherein the first section and the second section are arranged such that the first section and the second section at least partially overlap each other and an insulation layer is interposed between the first section and the second section.

2. The blade according to claim 1, further comprising:
a power transmitting section located on the outer surface of the blade, the power transmitting section comprising the power terminals for supplying power to the heating mat, wherein the first end section and the second end section are located inside the power transmitting section and are electrically connected to the power terminals, and
wherein the first section runs from the first end section to a region being located outside of the power transmitting section and the second section extends from the region being located outside of the power transmitting section to the second end section inside the power transmitting section.

3. The blade according to claim 2, further comprising:
a root end section with a fixing element for fixing the blade to a hub of the wind turbine; and
a tip end section,
wherein the power transmitting section is formed within the root end section, and
wherein the first section and the second section meet at a location in the tip end section.

4. The blade according to claim 1, wherein the heating mat comprising carbon fibres for generating heat.

5. The blade according to claim 1, wherein the heating mat is foldable for forming the loop.

6. The blade according to claim 1, wherein the first section and the second section are mounted to the outer surface such that between the first section and the second section a distance between each other is kept.

7. The blade according to claim 1, wherein the power terminals comprise an input power terminal and an output power terminal, and wherein the first end section is connected to the input power terminal and the second end section is connected to the output power terminal.

8. The blade according to claim 1, wherein the heating mat further comprising a third section extending parallel to the first section or to the second section.

9. The blade according to claim 8, wherein the third end section is electrically connectable to a respective power terminal for power input or power output.

10. The blade according to claim 1, further comprising:
a further heating mat for generating heat, wherein the further heating mat is mounted at the outer surface of the blade,
wherein the further heating mat comprises a further first section with a further first end section and a further second section with a further second end section, the further first end section and the further second end section are electrically connectable to a respective power terminal for supplying power to the further heating mat,
wherein the further second end section defines an opposite end section of the further heating mat in a further longitudinal direction of the further heating mat with respect to the further first end section, and wherein the further first section and the further second section extends along the surface of the blade in one or more loops from the further first end section to the further second end section.

11. A method for controlling the heating of the heating mat of the blade according to claim 1, the method comprising measuring and controlling the electrical power input to the heating mat by a control unit.

12. The method according to claim 11, further comprising: controlling the heating of the heating mat in dependency of a measured electrical conductivity of the heating mat.

13. A method of manufacturing a blade with a heating system for a wind turbine, the method comprising:
mounting a heating mat for generating heat at an outer surface of the blade of the wind turbine, wherein the heating mat comprises a first section with a first end section and a second section with a second end section, the second end section defines an opposite end section of the heating mat in a longitudinal direction of the heating mat with respect to the first end section; and
electrically connecting the first end section and the second end section to a respective power terminal,
wherein the first section and the second section run along the surface of the blade in one or more loops from the first end section to the second end section,
wherein the first section and the second section are arranged such that the first section and the second section at least partially overlap each other and an insulation layer is interposed between the first section and the second section.

* * * * *